May 28, 1940. G. V. PECK 2,202,166
CONDENSER MOUNTING
Filed Nov. 4, 1937 2 Sheets-Sheet 1
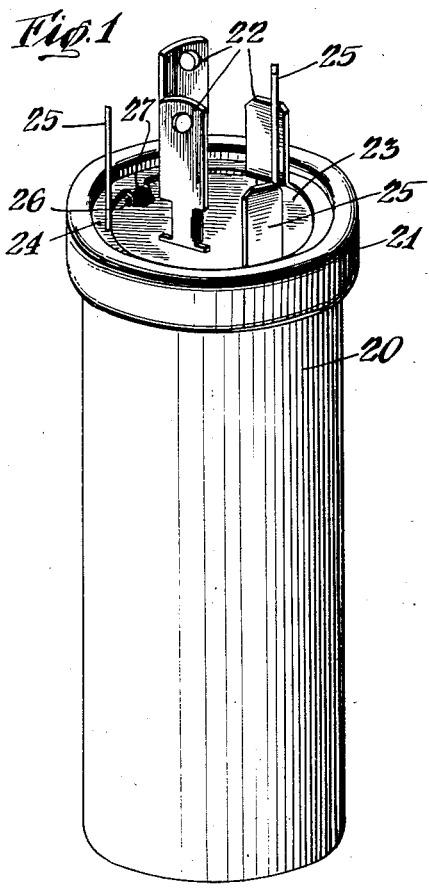
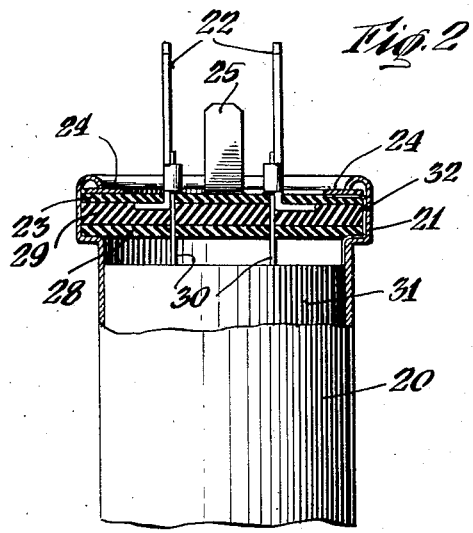
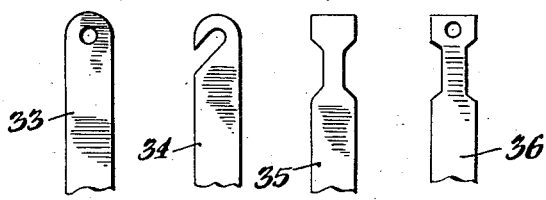
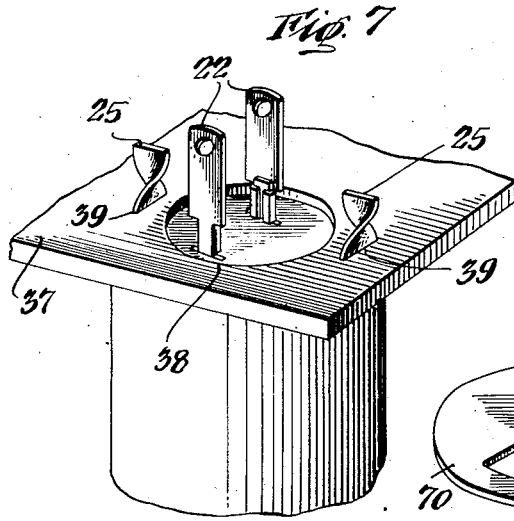
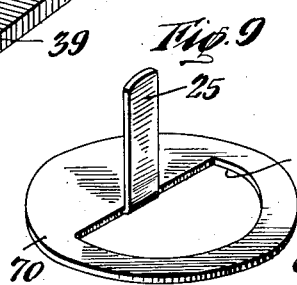
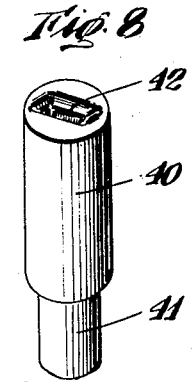
INVENTOR
Gordon V. Peck
BY
ATTORNEY May 28, 1940.  G. V. PECK  2,202,166
CONDENSER MOUNTING
Filed Nov. 4, 1937   2 Sheets-Sheet 2
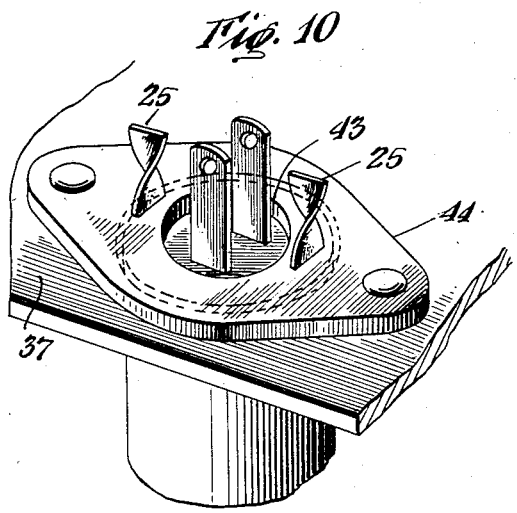
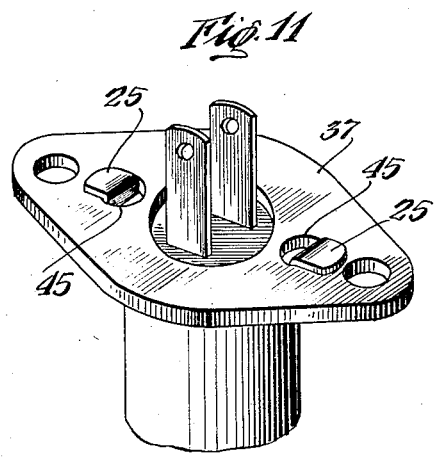
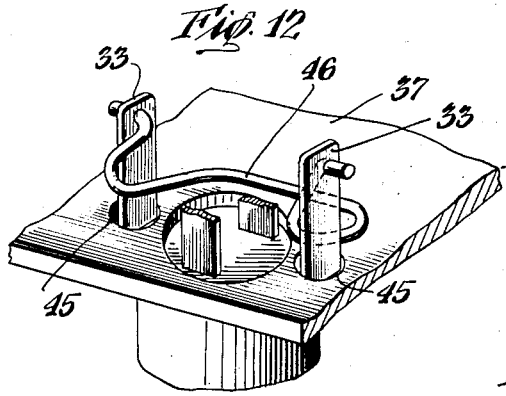
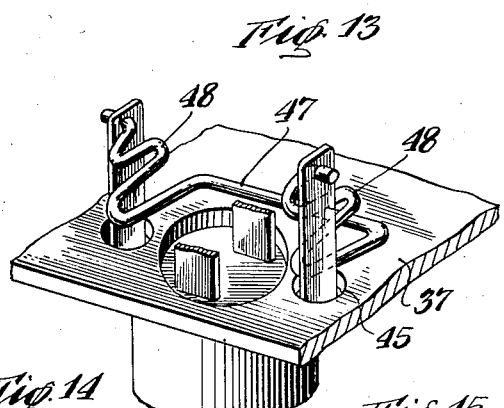
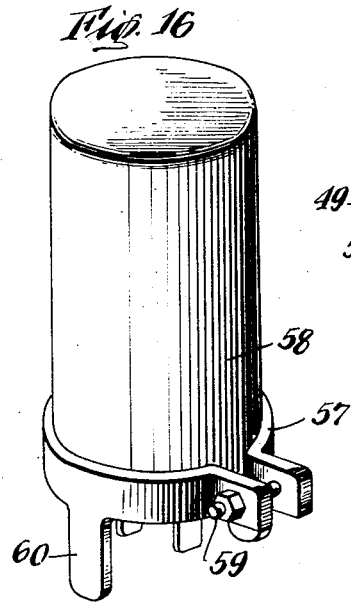
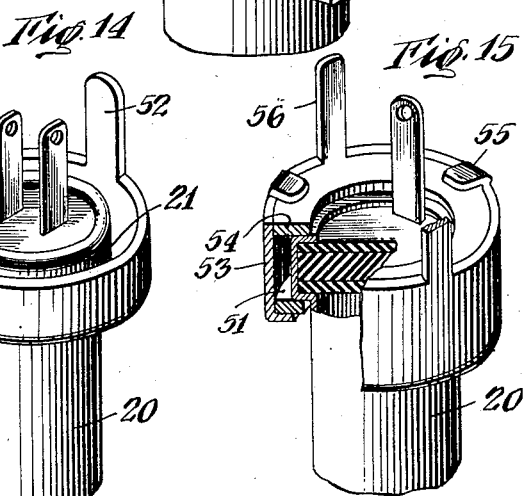
INVENTOR
Gordon V. Peck
BY
ATTORNEY Patented May 28, 1940

2,202,166

UNITED STATES PATENT OFFICE 2,202,166

CONDENSER MOUNTING

Gordon V. Peck, Indianapolis, Ind., assignor to P. R. Mallory & Co., Inc., Indianapolis, Ind., a corporation of Delaware Application November 4, 1937, Serial No. 172,722

7 Claims. (Cl. 175—315)

This invention relates to arrangements for mounting electrical capacitors, and other component parts of radio sets.

An object of the invention is to improve the mounting means for electric capacitors.

Other objects of the invention will be apparent from the following description and accompanying drawings taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawings.

In the drawings:

Figure 1 is a perspective view showing an electrolytic condenser having mounting means arranged according to one aspect of the invention;

Figure 2 is a longitudinal section through a portion of a condenser of this type;

Figures 3, 4, 5 and 6, show various end formations for the mounting lugs;

Figure 7 illustrates one way of mounting the condenser;

Figure 8 represents a tool for mounting the condenser;

Figures 9, 10, 11, 12, and 13 show further means for mounting the condenser; and Figures 14, 15, and 16 show modified mounting arrangements.

According to the present invention, improved mounting arrangements are provided for condensers and like devices such as coil shields, tube shields, etc., and which are particularly suitable for the mounting of electrolytic capacitors. In certain embodiments of the invention, the mounting parts may also comprise one or more terminals of the capacitors. The mounting means of this invention facilitates rapid assembly of the devices and rapid mounting thereof on radio chassis or other panel member whereby the cost of manufacture and mounting is materially reduced, less space is required on the chassis and a rigid mechanically strong mounting is provided.

The mounting means can be grounded to the chassis or panel if desired or may be insulated therefrom in a simple and convenient manner.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawings, Figure 1 shows a dry electrolytic capacitor comprising a metal can 20, externally expanded at its open end to provide an external bead 21 within which is fitted a series of discs, for instance a pair of sheet Bakelite discs with a softer rubber disc sandwiched between them. Condenser terminal lugs 22 are mounted in the outermost disc 23, and the condenser electrodes within the can 20 are electrically connected to the respective terminals 22 by tabs which extend through the series of discs.

The mounting means for the capacitors comprises a metal ring 24, of the same diameter as the discs, which is laid against the top surface of disc 23, the edge of the can 20 being then spun over the top surface of the ring to firmly clamp the ring and discs together and seal the open end of can 20. Ring 24 is provided with one or more integral lugs 25 (3 in Figure 1) bent up from the inner edge of the ring. These lugs provide a mounting means for the condenser as will be hereafter described. In order to insure that lugs 25 are properly positioned with respect to the condenser terminals 22, a small hole 26 is punched in disc 23 and a small projection 27 is provided on ring 24 which extends into hole 26 to prevent turning of the ring after assembly.

Figure 2, shows a similar condenser in cross section, in this case, however, the condenser is provided with only two opposed securing lugs 25 to simplify the illustration. In this figure, it may be clearly seen how the top is formed of two Bakelite discs 23 and 28, between which are sandwiched a soft rubber disc 29, which is expanded against the condenser walls when the edge of the can is spun over the top of ring 24 whereby the condenser is effectively sealed. This figure also clearly illustrates how the tabs 30 connected to the condenser section 31 within the can are carried through the disc and clamped to terminals 22. In many embodiments, it is desired that one of the condenser electrodes be grounded to the can 20. This is accomplished in Figure 2 by bringing a tab 32, connected to that electrode, up along the inside wall of the can within the bead portion 21, and underneath ring 24. When the end of the can is spun over, the terminal 32 is firmly pressed against the wall of the can and also held in intimate contact with the ring 24 which is also connected to the can, thus making a good electrical connection.

The mounting lugs 25 illustrated in Figures 1 and 2 are plain rectangular or slightly rounded tongues. For certain applications, their forms may be necessary such as lug 33, shown in Figure 3, having a hole punched therein; lug 34 shown in Figure 4 slotted to provide a hook-shaped end; lug 35 shown in Figure 5, provided with a narrowed neck portion; and lug 36 shown in Figure 6 having both a narrowed neck portion and a hole therein.

In many cases, it is desired to ground the can 20 to the chassis of a radio set, upon which the condenser is mounted.

Figure 7 shows how the condenser may be mounted and grounded in the same operation. In this figure, the metal chassis 37, is provided with a circular aperture 38 and a pair of spaced rectangular apertures 39 on opposite sides thereof. The capacitor is very rapidly and conveniently mounted by merely pushing the lugs 25 through slots 39 and twisting them to lock the capacitor in position. The capacitor terminals 22 will project through round apertures 38 and be spaced and insulated therefrom. The wire connections to terminals 22 can readily be made before or after the capacitor is mounted in position.

Figure 8 shows a tool 40 suitable for use in twisting lugs 25 to secure the capacitor to the chassis. Tube 40 comprises shank portion 41 terminating in an end which is provided with a rectangular recess 42 adapted to fit over the lugs 25. The edges of recess 42 are rounded so that in turning the tool, the lugs 25 will be twisted, while at the same time the tool will ride off the end of the lug instead of tearing it.

Figure 9 shows a modified mounting ring 70 adapted to be spun under the edge of the can as previously described. Ring 70 has only one tongue 25 turned up from the edge of inner aperture 71, through which aperture the condenser terminal or terminals may extend.

Figure 10 shows a means for mounting wherein it is desired to insulate the can 20 from the chassis 37. In this arrangement a circular opening 43 of larger diameter than the can bead 21 is made in the chassis and a Bakelite sheet 44 is riveted over the opening 43. The apertures which were previously formed directly in the chassis are in this case made in the insulating sheet 44 and the condenser is then mounted on the Bakelite sheet, in the manner previously described.

Figure 11 shows a means for mounting the capacitors on chassis 37 wherein lugs 25 extend through small circular apertures 45 in the chassis and are bent over as shown.

In the arrangement shown in Figure 12, a capacitor having apertured lugs 33 of the type shown in Figure 3, is mounted on chassis 37 by extending lugs 33 through openings 45 in the chassis and then inserting the two ends of a cam-shaped piece of wire 46 in the small holes in lugs 33. The wire 46 is then rotated around until it becomes wedged against the surface of chassis 37, thus locking the condenser to the chassis.

Figure 13 shows a similar arrangement wherein a modified form of wire clip 47 is used having doubled portions 48 near its ends. This allows for greater variation in thickness of the chassis with use of the same parts.

Figure 14 shows another form of mounting arrangement comprising a flanged ring 49 of inside diameter which is larger than the outside diameter of can 20, but preferably smaller than the diameter of external bead 21. This ring is slipped over the outside of the can so that its inturned flanged portion 50 rests against the bead 21 or it may be provided with a separate washer 51 which rests against the bead. Washer 51 may be of insulating material if it is desired to isolate the ring 49 from the can.

Ring 49 is provided with lugs 52 similar to the lugs previously described which enable mounting in any of the ways already discussed.

Figure 15 shows a modification of the ring mounting just described wherein a ring 53 is provided which slips over the outside of the can as already described. In this case, however, in addition to the washer 51, which was used with ring 49, an additional washer 54 is provided which rests against the spun-over end of the can. Ring 53 has several ears 55, which are turned over on top of washer 54 thereby clamping the ring over the bead of the can and insulating it from the can if washers 51 and 54 are of insulating material. Ring 53 has lugs 56 for mounting as previously described.

Figure 16 shows a mounting ring 57 suitable for use with containers 58 having no external bead. The ring is merely placed around the container and clamped against the surface thereof by a screw 59. Ring 57 has a plurality of lugs 60 for adapting it to the chassis or other panel. The container may be a metal can or a cardboard tube or other type of housing.

By the present invention a condenser mounting is provided which is universal in application, low in cost and which enables rapid assembly of the units to a radio chassis or other panel. Less chassis space is required by this arrangement than has been heretofore necessary. The capacitors may be grounded or insulated from ground as desired. The parts may readily be disassembled for replacing purposes. The mounting is mechanically strong and rigid and also provides a good electrical connection.

For identifying purposes, the various condenser terminals 22 are punched with holes of different shapes, as illustrated. Thus one terminal may have a round hole, another a triangular hole, another a hole of square or a diamond shape, et cetera. This enables the identification of each electrode connection when wires are being connected to the condenser.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. An electrolytic condenser and mounting means therefor comprising a metal can having an internal shoulder near one end thereof, a laminated sealing cap for said can comprising at least two stiff layers and a pressure-deformable layer sandwiched between said stiff layers, said cap resting on said shoulder, a condenser terminal passing through said cap and a sheet metal ring resting on said cap, the free edge of said can being spun over said ring to secure said ring and cap in place and to apply pressure to said pressure-deformable layer, and integral sheet metal lugs secured to the inner edge of said ring and bent upwardly away from said cap, said lugs being adapted for mounting said condenser on a panel, and a projection on said ring engaged in a recess in the outermost stiff layer of said cap to prevent turning of said ring after assembly.

2. An electrolytic condenser and mounting means therefor comprising a metal can having an internal shoulder near one end thereof, a laminated sealing cap for said can comprising at least two stiff layers and a pressure-deformable layer sandwiched between said stiff layers, said cap resting on said shoulder, a condenser terminal passing through said cap and a sheet metal ring resting on said cap, the free edge of said can being spun over said ring to secure said ring and cap in place and to apply pressure to said pressure-deformable layer, and integral sheet metal lugs secured to the inner edge of said ring and bent upwardly away from said cap, and a panel having slots therein of substantially the same cross-sectional area as said lugs, said lugs being inserted through said slots and having their ends twisted thereby drawing said condenser against said panel and holding it in place thereon.

3. A mounted condenser assembly comprising a condenser can terminating in a free edge at one end, a cap inserted within said one end thereof, a sheet metal ring resting against the outer face of said cap, the free edge of said can being spun over said ring to secure said cap and ring in place, said ring having a plurality of integral tongues, a mounting panel having slots therein of substantially the same cross-sectional area as said tongues, said tongues extending through said slots and having their ends twisted to secure said condenser in place and a projection on said ring engaged in a recess in said cap to prevent turning of said ring with respect to said cap and condenser.

4. An electrolytic condenser and mounting means therefor comprising a cylindrical metal can having an internal shoulder near one end thereof, a circular insulating cap member for said can resting on said shoulder, a condenser terminal passing through said cap and a circular sheet metal ring member resting on said cap, the free edge of said can being spun over said ring to secure said ring and cap in place, integral sheet metal lugs secured to the inner edge of said ring and bent upwardly away from said cap, said lugs being adapted for mounting said condenser on a panel, one of said circular members having a projection thereon and the other of said circular members having a corresponding recess, said projection being engaged in said recess to prevent relative turning of said ring and cap members.

5. An electrolytic condenser and mounting means therefor comprising a cylindrical metal can having an internal shoulder near one end thereof, a laminated circular insulating cap member resting on said shoulder, a condenser terminal passing through the laminae comprising said cap and a circular sheet metal ring member resting on said cap, the free edge of said can being spun over said ring to secure said ring and cap in place, integral sheet metal lugs secured to the inner edge of said ring member and bent upwardly away from said cap, said lugs being adapted for mounting said condenser on a panel, and a projection on said ring and a corresponding recess in the uppermost lamina of said cap member, said projection being engaged within said recess to prevent turning of said ring relative to said cap after assembly.

6. An electrolytic condenser and mounting means therefor comprising a cylindrical metal can having an internal shoulder near one end thereof, a circular laminated sealing cap member for said can comprising at least one stiff layer and one pressure deformable layer, said cap resting on said shoulder, a condenser terminal passing through said cap and a sheet metal ring resting on said cap, the free edge of said can being spun over said ring to secure said ring and cap in place and to apply pressure to said pressure-deformable layer, integral sheet metal lugs secured to the inner edge of said ring and bent upwardly away from said cap, said lugs being adapted for mounting said condenser on a panel and a projection on said ring and a corresponding recess in the uppermost layer of said cap, said projection being engaged in said recess to prevent turning of said ring after assembly.

7. An electric condenser comprising a cylindrical container having an internal shoulder near one end thereof, a circular cap member resting on said shoulder, a condenser terminal passing through said cap and a circular sheet metal ring member resting on said cap, integral sheet metal lugs secured to the inner edge of said ring and bent upwardly away from said cap, said lugs being adapted for mounting said condenser on a panel, one of said circular members having a projection thereon and the other of said circular members having a corresponding recess, said projection being engaged in said recess to prevent relative turning of said ring and cap member.

GORDON V. PECK.